(12) United States Patent
Moix Olive

(10) Patent No.: US 11,828,687 B2
(45) Date of Patent: Nov. 28, 2023

(54) DETECTION OF A CLOGGED FILTER IN AN ASPIRATING DETECTION SYSTEM

(71) Applicant: Carrier Corporation, Palm Beach Gardens, FL (US)

(72) Inventor: Pere Moix Olive, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 240 days.

(21) Appl. No.: 17/114,159

(22) Filed: Dec. 7, 2020

(65) Prior Publication Data

US 2021/0348987 A1 Nov. 11, 2021

(30) Foreign Application Priority Data

May 8, 2020 (EP) .................................... 20382381

(51) Int. Cl.
*G01N 1/22* (2006.01)
*G01F 5/00* (2006.01)
*G08B 17/10* (2006.01)

(52) U.S. Cl.
CPC ........... *G01N 1/2205* (2013.01); *G01F 5/005* (2013.01); *G08B 17/10* (2013.01)

(58) Field of Classification Search
CPC ...... G01N 1/2205; G01F 5/005; G08B 17/10; G08B 29/043; G08B 17/107
See application file for complete search history.

(56) References Cited

U.S. PATENT DOCUMENTS

| | | |
|---|---|---|
| 4,035,788 A | 7/1977 | Barr |
| 5,493,100 A | 2/1996 | Renger |
| 6,052,058 A * | 4/2000 | Knox ..................... G01N 21/53 340/610 |
| 6,184,537 B1 | 2/2001 | Knox et al. |
| 6,285,291 B1 | 9/2001 | Knox et al. |
| 7,129,847 B2 | 10/2006 | Right et al. |

(Continued)

FOREIGN PATENT DOCUMENTS

| | | | |
|---|---|---|---|
| AU | 2012201531 A1 * | 4/2012 | ......... B01D 46/0012 |
| AU | 2012201531 A1 | 4/2012 | |

(Continued)

OTHER PUBLICATIONS

European Search Report for European Application No. 20382381.0; Report dated Nov. 4, 2020 (pp. 1-7).

*Primary Examiner* — Rebecca C Bryant
*Assistant Examiner* — Christopher J Gassen
(74) *Attorney, Agent, or Firm* — CANTOR COLBURN LLP

(57) ABSTRACT

A method for the detection of restricted airflow to a smoke sensor in a central detector unit of an aspirating smoke detection system. An aspirator of the detector unit draws air into the central detector unit along a plurality of sampling pipes. A first portion of the air is directed along a sensing conduit via a filter to the smoke sensor, whilst a second portion of the air continues along a primary conduit and is not directed through the smoke sensor. A first flow meter is positioned on the sensing conduit, and a second flow rate meter is positioned on the primary conduit. A ratio of the flow rates measured by the first and second flow meters is calculated, and used to determine that the filter is restricting airflow to the smoke sensor when the ratio exceeds a predetermined threshold.

6 Claims, 1 Drawing Sheet

(56) References Cited

U.S. PATENT DOCUMENTS

| | | | |
|---|---|---|---|
| 7,508,313 B2 | 3/2009 | Cole | |
| 2004/0035184 A1* | 2/2004 | Yamano | G08B 17/113 340/630 |
| 2009/0237261 A1* | 9/2009 | Yokota | G08B 17/10 340/628 |
| 2013/0061659 A1 | 3/2013 | Ajay et al. | |
| 2015/0096351 A1* | 4/2015 | Orsini | G08B 29/145 73/28.01 |
| 2015/0253165 A1* | 9/2015 | Ajay | G01F 1/66 73/28.01 |
| 2016/0116389 A1* | 4/2016 | Cooper | G01N 15/0205 356/340 |
| 2019/0285531 A1 | 9/2019 | Cooper et al. | |
| 2019/0383736 A1 | 12/2019 | Caubel et al. | |

FOREIGN PATENT DOCUMENTS

| | | |
|---|---|---|
| CN | 103063614 A | 4/2013 |
| CN | 103366495 A | 10/2013 |
| CN | 105374154 B | 11/2017 |
| EP | 2112639 A2 | 10/2009 |
| EP | 2645346 A2 | 10/2013 |
| EP | 2170486 B1 | 5/2014 |
| JP | 4791308 B2 | 10/2011 |
| JP | 4981404 B2 | 7/2012 |

\* cited by examiner

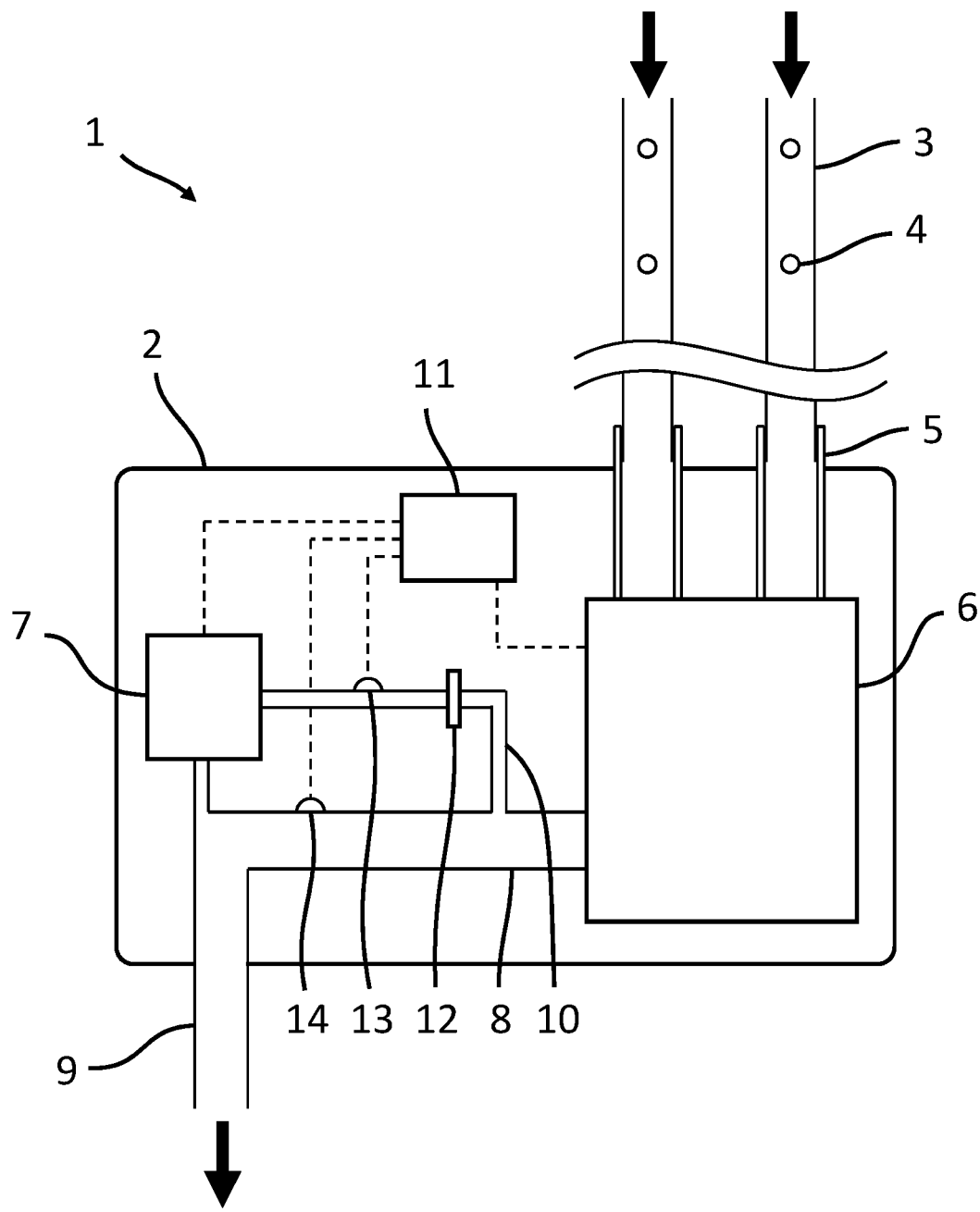

DETECTION OF A CLOGGED FILTER IN AN ASPIRATING DETECTION SYSTEM

CROSS-REFERENCE TO RELATED APPLICATIONS

This application claims priority to European Patent Application No. 20382381.0, filed May 8, 2020, the contents of which are incorporated by reference herein in their entirety.

BACKGROUND

The present disclosure relates to an aspirating detection system, and particularly to the detection of the clogging of a filter within a central detector unit of an aspirating detection system.

Aspirating detection systems utilise a sampling pipe network consisting of one or more sampling pipes with sampling holes open at positions where air samples are to be collected. Air is drawn in through the sampling holes and along the pipes by means of an aspirator within a central detector unit. In the case of an aspirating smoke detection system, the central detector unit operates to detect the presence of smoke and sometimes certain gases such as CO or NOx. Upon a threshold level of a substance being detected, an alarm may be activated and operation of a fire suppression system may be initiated.

Within the central detector unit, a portion of the airflow from the aspirator is directed into a sensor chamber. Typically, one or more filters are provided to remove larger particles, such as dust and the like, from the air entering the sensor chamber as these particles interfere with the smoke detection. Over time, this filter becomes clogged, which reduces the flow rate through the sensor chamber, and which in turn can affect the response of a smoke detector within the sensor chamber.

Normally, the filters within the detector unit are replaced on a regular schedule to minimise the risk of clogging. However, this increases the maintenance needs for the unit, and there is a risk that an operator may forget to change the filters regularly.

A need therefore exists for an improved central detector unit for an aspirating detection system.

SUMMARY

Viewed from a first aspect, the present invention provides a detector unit for use in an aspirating detection system, comprising: an aspirator for drawing air into the detector unit; a sensor chamber for analysing a sample of air, wherein a first portion of the air drawn into the detector unit by the aspirator is directed through the sensor chamber, and wherein a second portion of the air drawn into the detector unit by the aspirator is not directed through the sensor chamber; a filter arranged upstream of the sensor chamber for removing particulate matter from the first portion of the air; a first flow meter arranged to measure a first flow rate, which is a flow rate of the first portion of the air; a second flow meter arranged measure a second flow rate, which is a flow rate of the second portion of the air or a combined flow rate of the first and second portions of the air; and a controller configured to determine that the filter is restricting airflow to the sensor chamber based on the first and second flow rates.

By providing first and second flow meters as described above, clogging of the filter becomes readily apparent by comparison of the first and second flow rates. Thus, appropriate action can be taken as and when the filter becomes clogged. This avoids unnecessary changing of a filter before it becomes problematic. Furthermore, it removes the reliance upon a maintenance worker remembering to check the filter as an alert or the like can be actively generated when the filter requires attention.

The controller may be configured to generate an alert responsive to determining that the filter is restricting airflow. Generating the alert may comprise causing an audible or visual alert, and the detecting unit may comprise an audible or visual alarm for causing the audible or visual alert. Alternatively, or additionally, generating the alert may comprise sending a message sent to a remote terminal, which may be a fire panel or a mobile device, for example.

The controller may be configured determine that the filter is restricting airflow based on a ratio of the first and second flow rates, for example when the ratio exceeds a threshold value. Thus, the controller may be configured determine a ratio of the first and second flow rates and to compare the ratio to a predetermined threshold value.

Either or both of the first and second flow meters may comprise a thermistor, and particularly a negative temperature coefficient thermistor, i.e. wherein the resistance of the thermistor decreases as its temperature increases. A thermistor has high accuracy and a quick response time.

The detector unit may be a smoke detector unit, and the aspirating detection system may be an aspirating smoke detection system. The detector unit may comprise an optical smoke sensor comprising the sensor chamber. The optical smoke sensor may operate according to a light-scattering principle. The optical smoke sensor may comprise a light source, such as a laser, and a light detector.

The aspirator may comprise a centrifugal blower.

An aspirating detection system may comprise the detector unit described above, and one or more sampling pipes for supplying air to the detector unit, wherein the aspirator is configured to drawing air into the detector unit via the sampling pipes.

Viewed from a second aspect, the present invention provides a method for detection of restricted airflow to a sensor chamber in a detector unit of an aspirating detection system, the method comprising: operating an aspirator of the detector unit, wherein a first portion of the air drawn into the detector unit by the aspirator is directed through a sensor chamber, and wherein a second portion of the air drawn into the detector unit by the aspirator is not directed through the sensor chamber; determining a first flow rate, which is a flow rate of the first portion of the air; determining a second flow rate, which is a flow rate of the second portion of the air or a combined flow rate of the first and second portions of the air; and determining that a filter upstream of the sensor chamber is restricting airflow to the sensor chamber based on the first and second flow rates.

The detector unit may be a detector unit as described above, optionally including any one or more of the optional features described.

The method may comprise generating an alert responsive to determining that the filter is restricting airflow. Generating the alert may comprise causing an audible or visual alert, which may be caused by the detecting unit. Alternatively, or additionally, generating the alert may comprise sending a message sent to a remote terminal, which may be a fire panel or a mobile device.

Determining that the filter is restricting airflow may be determined based on a ratio of the first and second flow rates, for example when the ratio exceeds a threshold value. Thus, the method may comprise determining a ratio of the first and second flow rates and comparing the ratio to a predetermined threshold value.

The sensor chamber may be downstream of the aspirator. However, it will be appreciated that the system would still work if the aspirator was located downstream of the sensor chamber.

The detector unit may comprise a primary conduit and a sampling conduit, which branches off of the primary conduit. The air drawn into the detector unit by the aspirator may flow along the primary conduit. That is to say, the first and second portions of air may flow along the primary conduit and, after the branch, the first portion of air may flow along the sampling conduit and the second portion of the air may continue to flow along the primary conduit. The air from the sensor chamber may be output back into the primary conduit. The primary conduit may connect to an outlet of the detector unit, which may be downstream of the branch.

The sampling conduit may supply air to the sensor chamber, and may comprise the filter. The first smoke detector may be provided in the sampling conduit. The first flow meter may be upstream or downstream of the filter.

The second flow meter may be provided in the primary conduit. The second flow meter may be upstream or downstream of the branch and/or may be upstream or downstream of where the air from the sensor chamber re-joins the primary conduit. The second flow meter may be provided upstream of the aspirator.

Either or both of the first and second flow meters may comprise a thermistor, and particularly a negative temperature coefficient thermistor, i.e. wherein the resistance of the thermistor decreases as its temperature increases.

The detector unit may be a smoke detector unit, and the aspirating detection system may be an aspirating smoke detection system. The detector unit may comprise an optical smoke sensor comprising the sensor chamber. The optical smoke sensor may operate according to a light-scattering principle. The optical smoke sensor may comprise a light source, such as a laser, and a light detector.

The aspirator may comprise a centrifugal blower.

DRAWING DESCRIPTION

A preferred embodiment of the invention will now be described in greater detail, by way of example only and with reference to the accompanying FIGURE.

FIG. 1 shows a schematic diagram of an aspirating smoke detection system.

DETAILED DESCRIPTION

An aspirating smoke detection system 1 is shown in FIG. 1. The system 1 comprises a central detector unit 2 and a plurality of pipes 3 for supplying sample air to the central detector unit 2.

The pipes 3 extend across a sample area, which may be a single room or multiple rooms. Each pipe 3 comprises a plurality of sample holes 4 for sampling air across the sample area. The sampling pipes 3 each connect to respective inlets 5 of the central detector unit 2. Whilst two discrete pipes 3 are shown in the illustrated example, more or fewer pipes 3 may connect to the central detector unit 2. Furthermore, one or more of the pipes 3 may comprise one or more branches along its length.

The central detector unit 2 comprises an aspirator 6 and a smoke sensor 7. The aspirator 6 is connected to the pipes 3 so as to draw air along the pipes 3 into the central detector unit 2, for supply to the smoke sensor 7. The aspirator 6 in this embodiment is a centrifugal blower. However, other types of pump may be used as the aspirator 6.

In order to provide sufficient suction to draw air consistently along the pipes and at a sufficient rate to ensure rapid detection of fire, the aspirator 6 will normally be sized to draw significantly more air into the central detector unit 2 than the smoke sensor 7 can process. Therefore, only a portion of the air drawn into the central detector unit 2 is passed to the smoke sensor 7.

In this illustrated embodiment, the sample air is output from the aspirator 6 into a primary outlet conduit 8, which connects to an outlet 9 of the central detector unit 2. Upstream of the outlet 9, a sampling conduit 10 branches off of the primary outlet conduit 8, such that a portion of the air from the aspirator 6 is directed along the sampling conduit 10 and into the smoke sensor 7.

The smoke sensor 7 is an optical smoke sensor configured to detect the presence of smoke by a light-scattering technique. The smoke sensor 7 comprises a sensor chamber, and a beam of laser light is directed into the sensor chamber. When no smoke is present in the sensor, the laser beam passes through the sensor chamber undisturbed and is absorbed by a light absorber at the other side of the sensor chamber. When smoke is present in the chamber, the laser beam is scattered by the smoke particles in the air and is detected by a photodetector within the sensor chamber.

A controller 11 receives sensor data from the smoke sensor 7, and particularly from the photodetector of the smoke sensor 7. The controller may process the sensor data locally in order to determine whether or not to trigger one or more alerts. The alert may comprise an audible alarm using an alarm of the central detector unit 2. Alternatively, or additionally, the alert may comprise sending a message to a remote unit, such as a fire panel or the like.

Dust and other particles carried in the air can cause scattering of the light in a similar manner to smoke, and can therefore cause false alarms if it enters the sensor chamber of the smoke detector 7. Consequently, a filter 12 is provided within the sampling conduit upstream of the smoke detector 7. The filter has a mesh size that allows smoke particles to pass, but captures larger particles such as dust. In one example, the filter may remove particles having a size greater than 20 micrometres.

Over time, the filter 12 will become clogged due to the accumulation of dust and other particles removed from the airflow. This reduces the airflow passing into the sensor chamber of the smoke detector 7. Eventually it is necessary for an operator to clean or replace the filer 12.

In order to determined whether the filter 12 requires cleaning or replacement, a pair of flow rate sensors 13, 14 are provided. The first flow rate sensor 13 is provided in the sampling conduit 10 to measure the flow rate of the air in the sampling conduit 10. The second flow rate sensor 14 is provided in the primary conduit 8 to measure the flow rate of the air emitted by the aspirator 6.

The controller 11 receives sampling airflow data from the first flow rate sensor 13 and aspirator airflow data from the second flow rate sensor 14. In order to determine the degree of clogging of the filter 12, the controller 11 compares the sampling airflow data and the aspirator airflow data. In a preferred embodiment, the controller 11 determines a ratio between a sampling airflow rate and an aspirator airflow rate, which corresponds to the degree of clogging of the filter 12.

When the ratio between the sampling airflow rate and the aspirator airflow rate falls below a predetermined threshold, the controller 11 determines that the filter 12 is clogged and requires cleaning or replacement. The controller 11 may generate an alert in response to determining that the filter requires cleaning or replacement. The alert may comprise a visual or audible alert from the central detector unit 2. Alternatively, or additionally, the alert may comprise sending a message to a remote unit, such as a fire panel or to a mobile device of an operator.

In the illustrated embodiment, the first flow rate sensor 13 is downstream of the filter 12 and upstream of the smoke sensor 7. However, it may alternatively be upstream of filter 12 in the sampling conduit 10.

In the illustrated embodiment, the second flow rate sensor 14 is downstream of the branch of the sampling conduit 10 from the primary conduit 8. However, it may alternatively be upstream of the branch of the sampling conduit 10 or downstream of where the air from the smoke detector rejoins the primary conduit 8. In yet a further embodiment, the second flow rate sensor 14 may be upstream of the aspirator 6, i.e. such that it measures a flow rate into the aspirator 6, rather than the flow rate output by the aspirator 6.

The first and second flow rate sensors 13, 14 use thermistors to measure the respective flow rate. The thermistors are heated by supply of a predetermined power level and the resulting temperature of the thermistors can be measured based on their resistance. The degree of cooling provided by the passage of air corresponds to the flow rate of the air. However, the flow rate sensors 13, 14 will be affected by the pressure, temperature, density and humidity of the air. By examining a ratio, it is not necessary to account for these variable factors because they will affect both flow rate sensors 13, 14.

Whilst the described embodiment relates to an aspirating smoke detection system, it will be appreciated that the techniques described above may be applied to any aspirating detection system having a filter.

What is claimed is:

1. A detector unit for use in an aspirating detection system, comprising:
    an aspirator for drawing air into the detector unit;
    a sensor chamber for analysing a sample of air, wherein a first portion of the air drawn into the detector unit by the aspirator is directed through the sensor chamber, and wherein a second portion of the air drawn into the detector unit by the aspirator is not directed through the sensor chamber;
    a filter arranged upstream of the sensor chamber for removing particulate matter from the first portion of the air;
    a first flow meter arranged to measure a first flow rate, which is a flow rate of the first portion of the air;
    a second flow meter arranged measure a second flow rate, which is a flow rate of the second portion of the air or a combined flow rate of the first and second portions of the air; and
    a controller configured to determine that the filter is restricting airflow to the sensor chamber based on the first flow rate of the first portion of the air that is directed through the sensor chamber and the second flow rates of the second portion of the air that is not directed through the sensor chamber or of a combined flow of the first portion of air that is directed through the sensor chamber and the second portion of air that is not directed through the sensor chamber;
    wherein the controller is configured to determine a ratio of the first flow rate of the first portion of the air that is directed through the sensor chamber and the second flow rates of the second portion of the air that is not directed through the sensor chamber, compare the ratio to a predetermined threshold value, and determine that the filter is restricting airflow to the sensor chamber when the ratio exceeds a threshold value; and
    wherein the controller is configured to generate an alert responsive to determining that the filter is restricting airflow.

2. A detector unit according to claim 1, wherein one or each of the first and second flow meters comprises a thermistor.

3. A detector unit according to claim 1, wherein the detector unit is a smoke detector unit.

4. An aspirating detection system comprising:
    a detector unit according to claim 1, and
    one or more sampling pipes for supplying air to the detector unit,
    wherein the aspirator is configured to draw air into the detector unit via the sampling pipes.

5. A method for detection of restricted airflow to a sensor chamber in a detector unit of an aspirating detection system, the method comprising:
    operating an aspirator of the detector unit, wherein a first portion of the air drawn into the detector unit by the aspirator is directed through a sensor chamber, and wherein a second portion of the air drawn into the detector unit by the aspirator is not directed through the sensor chamber;
    determining a first flow rate, which is a flow rate of the first portion of the air;
    determining a second flow rate, which is a flow rate of the second portion of the air or a combined flow rate of the first and second portions of the air;
    determining that a filter upstream of the sensor chamber is restricting airflow to the sensor chamber based on the first flow rate of the first portion of the air that is directed through the sensor chamber and the second flow rate of the second portion of the air that is not directed through the sensor chamber or of a combined flow of the first portion of air that is directed through the sensor chamber and the second portion of air that is not directed through the sensor chamber;
    determining a ratio of the first flow rate of the first portion of the air that is directed through the sensor chamber and the second flow rate of the second portion of the air that is not directed through the sensor chambers and comparing the ratio to a predetermined threshold value,
    wherein determining that the filter is restricting airflow to the sensor chamber comprises determining that the ratio exceeds a threshold value; and
    generating an alert responsive to determining that the filter is restricting airflow when the ratio exceeds the threshold value.

6. A method according to claim 5, wherein the detector unit is a smoke detector unit, and the aspirating detection system is an aspirating smoke detection system.

* * * * *